(12) United States Patent
Cooper et al.

(10) Patent No.: US 7,153,572 B2
(45) Date of Patent: Dec. 26, 2006

(54) POROUS BEADS AND METHOD OF PRODUCTION THEREOF

(75) Inventors: Andrew Ian Cooper, Liverpool (GB); Haifei Zhang, Liverpool (GB)

(73) Assignee: Conopco, Inc., Edgewater, NJ (US)

( * ) Notice: Subject to any disclaimer, the term of this patent is extended or adjusted under 35 U.S.C. 154(b) by 18 days.

(21) Appl. No.: 10/522,485

(22) PCT Filed: Jul. 29, 2003

(86) PCT No.: PCT/GB03/03226

§ 371 (c)(1), (2), (4) Date: Jan. 26, 2005

(87) PCT Pub. No.: WO2004/011537

PCT Pub. Date: Feb. 5, 2004

(65) Prior Publication Data

US 2006/0154067 A1    Jul. 13, 2006

(30) Foreign Application Priority Data

Jul. 30, 2002    (GB) ................................. 0217587.5

(51) Int. Cl.
B32B 5/16    (2006.01)
(52) U.S. Cl. ....................... 428/402; 428/403; 428/407
(58) Field of Classification Search ................ 428/402, 428/407
See application file for complete search history.

(56) References Cited

U.S. PATENT DOCUMENTS

| | | | |
|---|---|---|---|
| 3,932,943 A * | 1/1976 | Briggs et al. ................. 34/287 |
| 4,511,677 A | 4/1985 | Horton et al. |
| 4,741,872 A * | 5/1988 | De Luca et al. ............. 264/4.7 |
| 4,818,542 A | 4/1989 | DeLuca et al. |
| 4,848,094 A | 7/1989 | Davis et al. |
| 5,100,669 A | 3/1992 | Hyon et al. |
| 5,160,745 A * | 11/1992 | DeLuca et al. ............. 424/487 |
| 5,384,124 A | 1/1995 | Courteille et al. |
| 5,405,616 A | 4/1995 | Wunderlich et al. |
| 5,536,430 A | 7/1996 | Fues et al. |
| 5,550,044 A | 8/1996 | Kosak et al. |
| 5,723,508 A | 3/1998 | Healy et al. |
| 5,958,389 A | 9/1999 | Le Bras-Roulier et al. |
| 6,048,908 A | 4/2000 | Kitagawa |
| 6,100,306 A | 8/2000 | Li et al. |
| 6,200,949 B1 | 3/2001 | Reijmer et al. |
| 6,218,440 B1 | 4/2001 | Kitagawa |
| 6,277,932 B1 | 8/2001 | Whitley et al. |
| 6,361,813 B1 | 3/2002 | Kitaoka et al. |
| 6,375,985 B1 | 4/2002 | Bomberger et al. |
| 6,395,302 B1 | 5/2002 | Hennink et al. |
| 6,403,057 B1 | 6/2002 | Schneider et al. |
| 6,624,136 B1 | 9/2003 | Guerin et al. |
| 6,627,597 B1 | 9/2003 | Achanta et al. |
| 6,693,159 B1 * | 2/2004 | Holmes et al. .......... 526/323.1 |
| 2003/0031701 A1 | 2/2003 | Burke |
| 2003/0064097 A1 | 4/2003 | Patel et al. |
| 2003/0180352 A1 | 9/2003 | Patel et al. |

FOREIGN PATENT DOCUMENTS

| | | |
|---|---|---|
| CA | 2 092 349 | 9/1993 |
| DE | 37 14276 | 11/1988 |
| EP | 0 352 190 | 11/1992 |
| EP | 1 029 886 | 8/2000 |
| JP | 59 169504 | 9/1984 |
| JP | 60 239417 | 11/1985 |
| JP | 62 186995 | 8/1987 |
| JP | 3 292303 | 12/1991 |
| WO | 99/38945 | 8/1999 |
| WO | 00/22083 | 4/2000 |
| WO | 01/19345 | 3/2001 |
| WO | 01/64188 | 9/2001 |
| WO | 2004/011537 | 2/2004 |
| WO | 2005/014704 | 2/2005 |

OTHER PUBLICATIONS

Bjerknes, K., et al., *Preparation of polymeric microbubbles: formulation studies and product characterisation*, International Journal of Pharmaceutics, 158 (2): 129-136, Dec. 8, 1997.

Choi, M.G., et al., *Fabrication and characterization of porous PLLA scaffolds with gentamicin sulfate release system*, Polymer-Korea, 25 (3): 318-326, May 2001.

Heinzelmann, K., et al., *Using freezing and drying techniques of emulsions for the microencapsulation of fish oil to improve oxidation stability*, Colloids and Surfaces B-Biointerfaces, 12 (306): 223-229, Jan. 15, 1999.

Jeon, E.K., et al., *Preparation and release profile of NGF-loaded polylactide scaffolds for tissue engineered nerve regeneration*, Polymer-Korea, 26 (6): 893-901, Nov. 2001.

Khang, G., et al., *Preparation and characterization of demineralized bone particle impregnated poly (L-lactide) scaffolds*, Korea Polymer Journal, 9 (5): 267-276, Oct. 31, 2001.

(Continued)

*Primary Examiner*—Leszek B. Kiliman
(74) *Attorney, Agent, or Firm*—Michael P. Aronson

(57) ABSTRACT

The present invention relates to porous beads and to methods of production thereof, in particular to a method of producing hydrophilic polymeric beads by freeze-drying a droplet containing a polymeric material in a continuous phase of an oil-in-water (O/W) emulsion.

20 Claims, 7 Drawing Sheets

OTHER PUBLICATIONS

Khang, G., et al., *Fabrication of tubular porous PLGA scaffold by emulsion freeze-drying method*, Polymer-Korea, 23 (3): 471-477, May 1999.

Kohga, M., et al., *Preparation of fine Ammonium Perchlorate by freeze-drying*, Kagaku Kogaku Ronbunshu, 23 (2): 163-169, Mar. 1997.

Park, E.Y., et al. *Effects of protein and peptide addition on lipid oxidation in powder model system*, Journal of Agricultural and Food Chemistry, 53 (1): 137-144, Jan. 12, 2005.

Whang, K., et al., *A biodegradable polymer scaffold for delivery of osteotropic factors*, Biomaterials, 21 (24): 2545-2551, Sp. Iss. SI Dec. 2000.

Whang, K., et al., *Engineering bone regeneration with bioabsorbable scaffolds with novel microarchitecture*, Tissue Engineering, 5 (1): 35-51, Spring 1999.

Whang, K., et al., *A novel method to fabricate bioabsorbable scaffolds*, Polymer, 36 (4): 837-842, Feb. 1995.

European Search Report No. GB 0217587.5 dated Feb. 3, 2003-2 pp.

International Search Report No. PCT/GB 03/03226 dated Dec. 16, 2003- 3 pp.

WPI Acc. No. 1993-305225/199339 Derwent abstracts of CA 2 092 349.

WPI Acc. No. 1990-024561/199004 Derwent abstract of EP 0 352 190.

WPI Acc. No. 1986-017004/198603 Derwent abstract of JP 60-239417.

WPI Acc. No. 1984-273740/198444 Derwent abstract of 59-169504.

WPI Acc. No. 1987-268046/198738 Derwent abstract of 62-186995.

WPI Acc. No. 1988-330816/198847 Derwent abstract of DE 37 14276.

WPI Acc. No. 1992-046218/199206 Derwent abstract of 3-292303.

\* cited by examiner

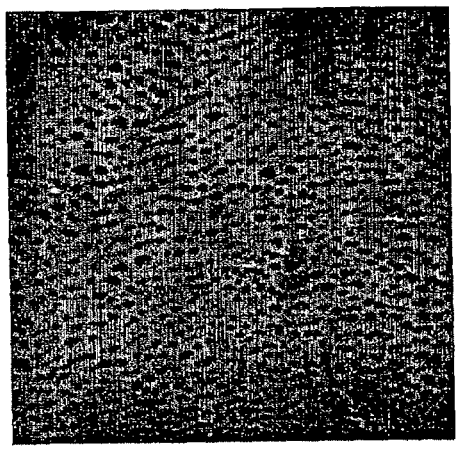
Figure 2 (x 4000)
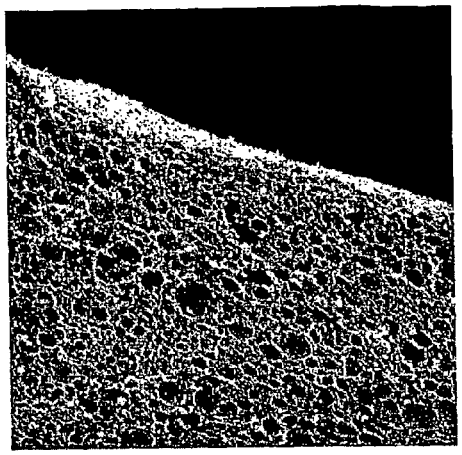
Figure 4 (x 1000)
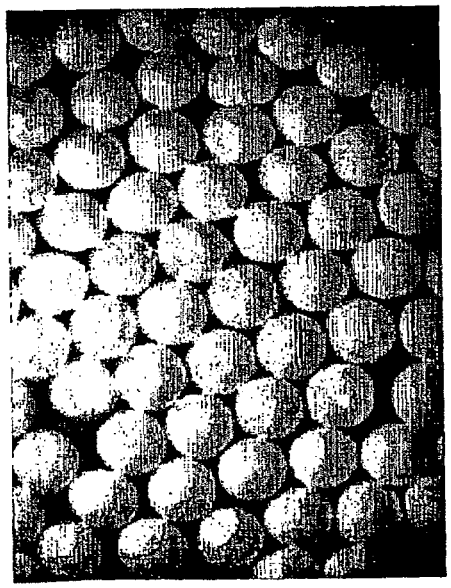
Figure 1
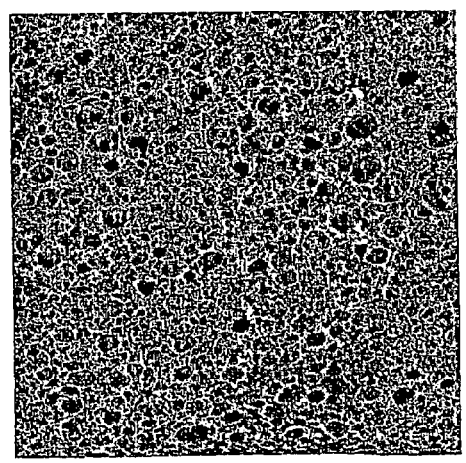
Figure 3 (x 1500)

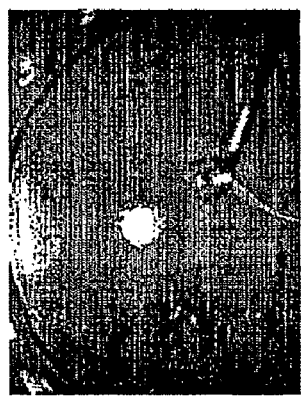
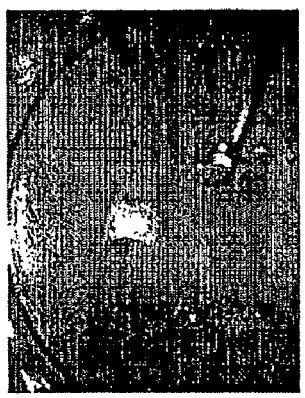
Figure 5

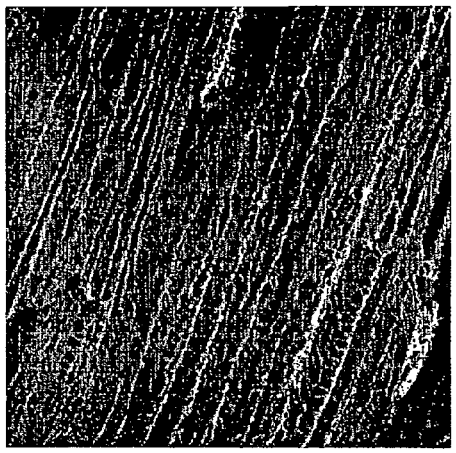
Figure 7 (x 1250)
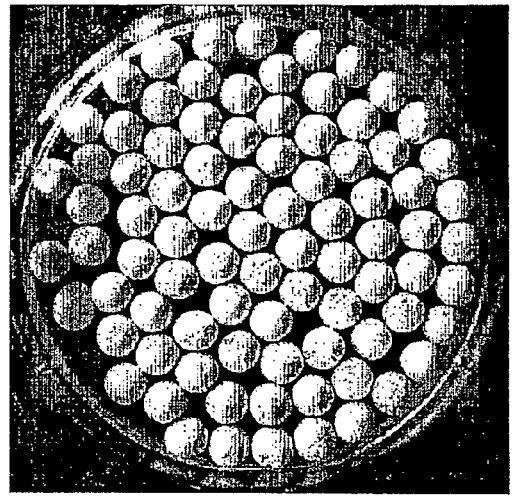
Figure 9
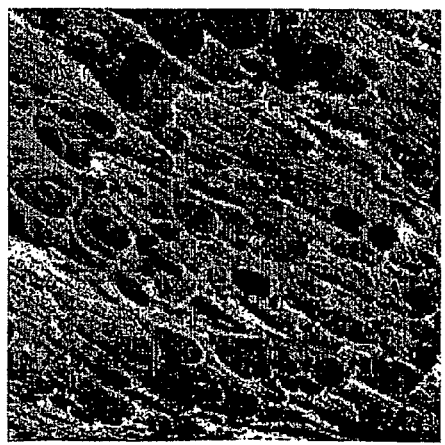
Figure 6 (x 2500)
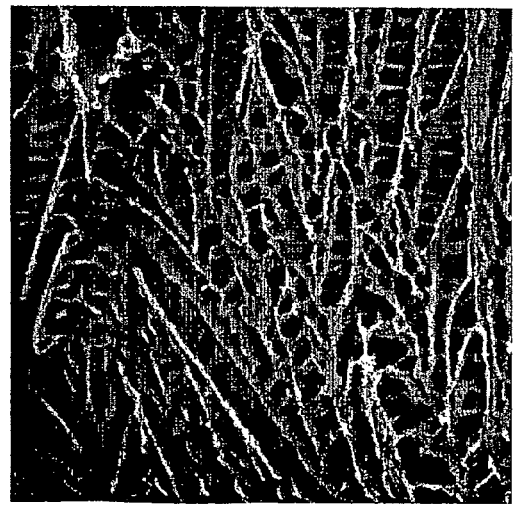
Figure 8 (x 2000)

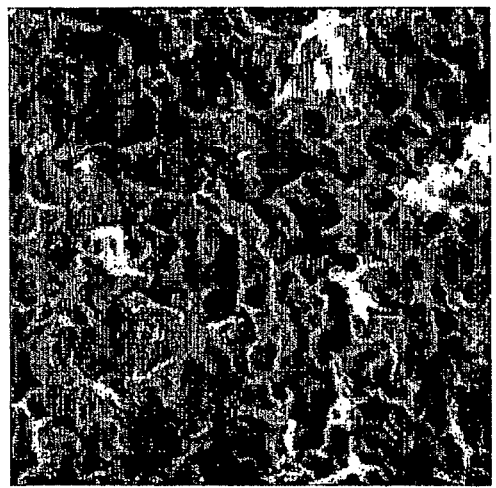
Figure 11 (x 1000)
Figure 13 (x 200)
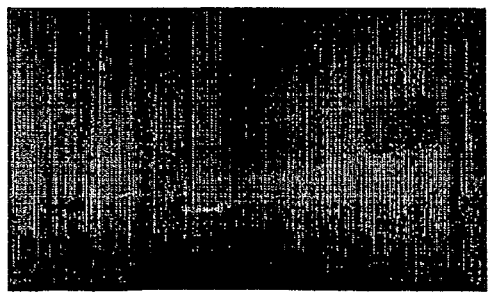
Figure 10
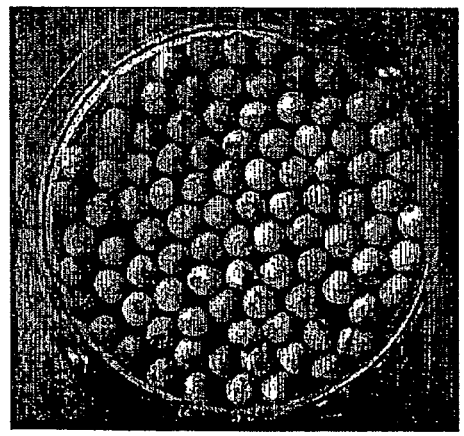
Figure 12

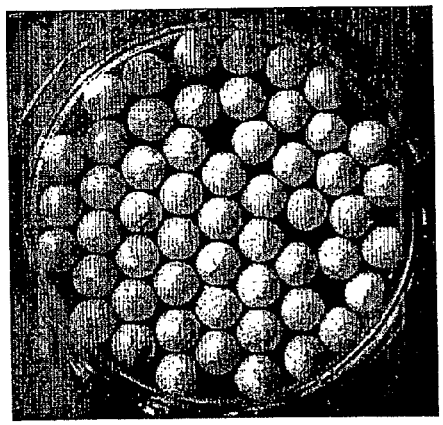
Figure 15
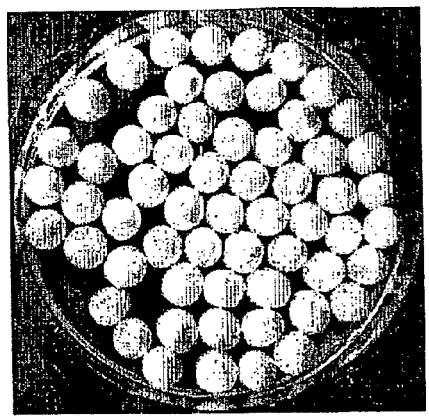
Figure 17
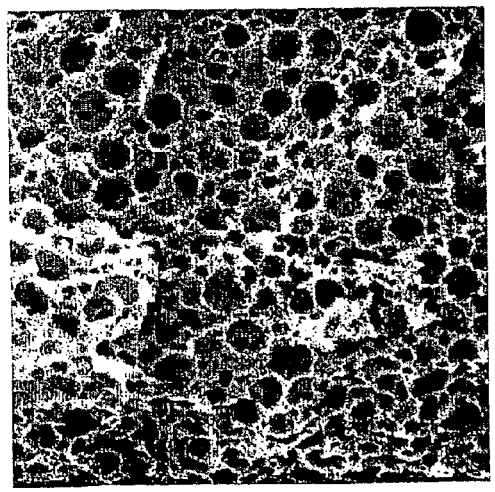
Figure 14 (x 500)
Figure 16

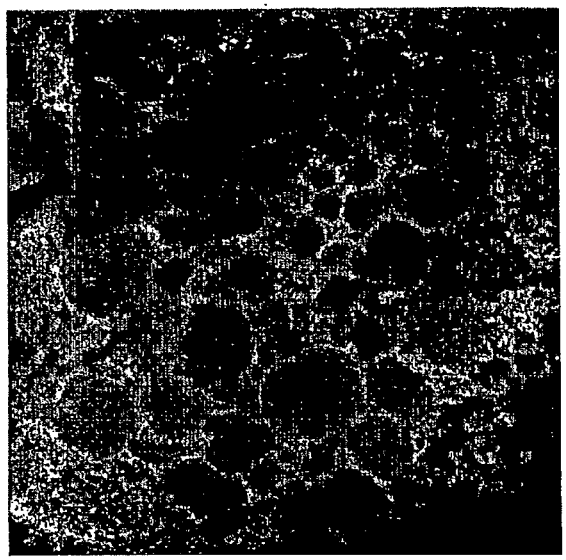
Figure 19 (x 100)
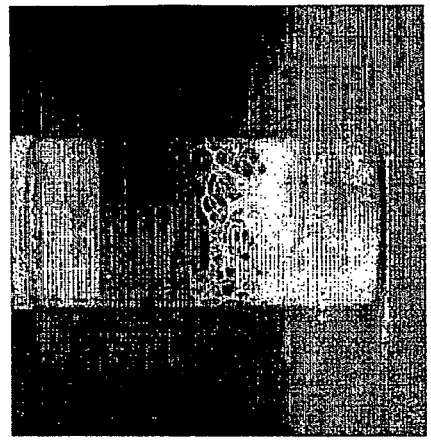
Figure 21
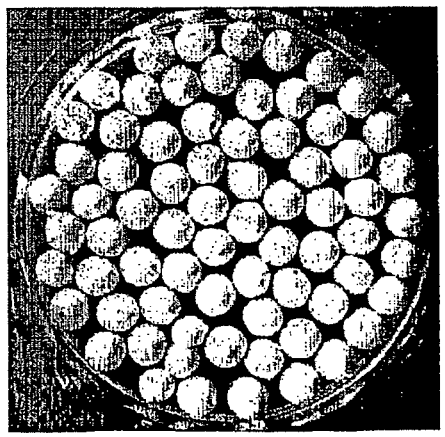
Figure 18
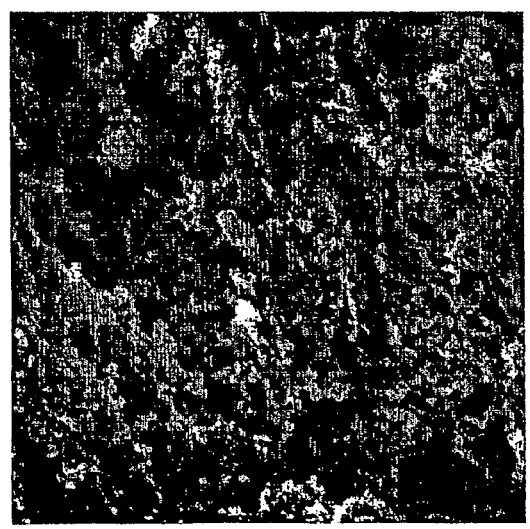
Figure 20 (x 2000)

POROUS BEADS AND METHOD OF PRODUCTION THEREOF

The present invention relates to porous beads and to methods of production thereof, in particular to a method of producing hydrophilic polymeric beads by freeze-drying a droplet containing a polymeric material in a continuous phase of an oil-in-water (O/W) emulsion.

Porous polymeric materials have been used in a variety of applications and have proved especially useful in the biomedical field, for Example, as label or sensing-device carriers, affinity chromatography agents, for the immobilisation of enzymes and in drug delivery. Certain porous polymeric materials can be produced using high internal phase emulsions (HIPEs), which are emulsions where the volume percent of the internal phase is typically greater than 74.05% (P. Hainey, et al., *Macromolecules* 1991, 24, 117; N. R. Cameron, et al. *Adv. Polym. Sci.* 1996, 126, 163; A. Barobtainta, et al., *Chem Commun.*, 2000, 221). U.S. Pat. Nos. 6,048,908; 6,100,306; 6,218,440 disclose the direct synthesis of HIPE microbeads by polymerization of suspensions of HIPE droplet. The structure produced by a HIPE, is often referred to as a 'template structure'. A general disadvantage of this method is that the particles are produced with a relatively broad size range. In addition to this disadvantage, the emulsion may become phase-separated during the relatively long period of the suspension polymerization. It is also not possible to produce water-soluble materials via this method because the products are highly cross-linked and therefore water insoluble.

An alternative method to produce porous materials from emulsions is to freeze the emulsion very quickly and to "lock in" its structure. By using a homogenizer, emulsions can be made with a polar solvent dispersed in a non-polar solvent with a dissolved polymer and these emulsions may be shaped by pouring into a mould. By contacting the mould with liquid nitrogen, the emulsion is frozen and then exposed to vacuum. After freeze drying the dry porous materials can be collected. U.S. Pat. No. 5,723,508 discloses a method of fabricating emulsion freeze-dried scaffold bodies by introducing the emulsion into a mould which is then subjected to freezing and freeze-drying steps. Scaffolds can be utilised in tissue engineering, such as in the preparation of demineralised bone particles (Khang et al., *Korea Polymer Journal*, 2001, 9, 267). An alternative method of producing temporary scaffolds in tissue engineering is by utilising a method termed 'ice leaching', which uses ice particles as a porogen material. For Example, freeze-drying of an ice suspension allows for the generation of porous, ice-templated materials (Chen et al., *Materials. Science & Engineering C*, 2001, 17, 63).

U.S. Pat. No. 3,932,943 discloses a method of preparing lyophilized biological products by spraying biologically active components contained solutions or colloidal suspensions into a moving bath of fluorocarbon refrigerant and lyophilizing the resultant frozen droplets. U.S. Pat. No. 4,848,094 further discloses a method and apparatus for generating essentially spherical frozen droplets of a liquid biological or organic-comprising composition.

One method for producing spherical polymer beads with very precise control over bead size is by sedimentation polymerization (E. Ruckenstein, et al., *Polymer*, 1995, 36, 2857; E. Ruckenstein et al., *J. Appl. Polym. Sci.*, 1996, 61, 1949). In this process, monomer droplets are partially polymerised during sedimentation through an immiscible medium. The size distribution of the beads so produced may be very narrow because the droplets are spatially isolated from one another during sedimentation. U.S. Pat. No. 6,277,932 discloses a reverse phase bead forming process. Again, neither of these methods can produce water-soluble materials because the polymers are highly chemically cross-linked.

It is an object of the present invention to provide highly porous beads with desirable properties such as high intrusion volumes (or, conversely, low bulk densities), uniform size distribution, uniform shape distribution and, depending on the end use of the beads, water solubility. It is a further object of the invention to provide a simple and effective method for producing such beads.

In accordance with a first aspect of the invention, there is provided a population of hydrophilic porous polymeric beads, each bead in the population comprising a three dimensional open-cell lattice of a water soluble polymeric material, the lattice having a porous structure providing in each bead an intrusion volume of at least about 3 ml/g, each bead in the population having a substantially uniform shape and size distribution.

Also provided in accordance with the invention is a hydrophilic porous polymeric bead comprising a three dimensional open-cell lattice of a water-soluble polymeric material, the lattice having a porous structure providing in the bead an intrusion volume of at least about 3 ml/g.

Preferably, the intrusion volume in each bead is at least about 3.5 ml/g, more preferably at least about 4 ml/g, even more preferably at least about 4.5 ml/g, and most preferably at least about 5 ml/g. For Example, the intrusion volume may be from about 3 ml/g to about 20 ml/g, preferably from about 3.5 ml/g to about 18.0 ml/g, more preferably from about 4 ml/g to about 17 ml/g, even more preferably from about 4.5 ml/g to about 16.5 ml/g and most preferably from about 5 ml/g to about 16 ml/g. The intrusion volumes of particularly preferred beads according to the invention are from about 4 ml/g to about 7 ml/g, even more preferably from about 4.5 ml/g to about 6.5 ml/g and most preferably from about 5 ml/g to about 6 ml/g.

The beads according to this first aspect of the invention are hydrophilic, the polymeric framework being formed from a water-soluble polymeric material. However, in another aspect of the invention the bead population is treated with a chemical cross-linking agent to provide covalently cross-linked beads which are water insoluble and of enhanced mechanical strength but otherwise maintain the same or similar characteristics of intrusion volume, shape distribution and size distribution as the uncross-linked beads.

The porous hydrophilic bead of the invention may be formed from an emulsion, preferably from an emulsion with an internal phase in the range of from about 50% to about 80%.

The bulk density of the bead of the invention is preferably in the range of from about 0.05 to about 1.0 g/cm$^3$, more preferably from about 0.1 to about 0.75 g/cm$^3$, and most preferably from about 0.2 to about 0.5 g/cm$^3$.

The beads of the invention are obtainable from an emulsion by a process which will be described hereafter. These beads generally exhibit more than one distinct type of pore, at least one pore type arising from the evacuation of an aqueous component of the emulsion from the bead lattice and at least one other pore type arising from the evacuation of an organic component of the emulsion from the bead lattice. Pore types may differ in their shape, size or other characteristics. Often, the starting emulsion will comprise a surfactant emulsifier, in which case the lattice of the bead may further comprise surfactant moieties. Such surfactant moieties may be distributed throughout the lattice, and may be chemically or physically bound thereto Preferably, the beads of the invention are at least substantially spherical. Accordingly, in a preferred embodiment of the invention there is provided a plurality of porous hydrophilic beads, each bead having an interconnected template structure with surfactant moieties, the beads having a substantially uniform size distribution, an intrusion volume within the range of 5–6 ml/g, a bulk density within the range of 0.2–0.5 g/cm$^3$, and each bead being formed from an emulsion having an internal phase in the range of 50% to 80%.

The porous hydrophilic polymeric beads of the present invention possess many of the desirable properties of the prior art polymeric beads, such as HIPE-templated porosity and standard size distribution, in addition to being hydrophilic in nature. The beads may be made from high internal phase emulsions (HIPEs) or from emulsions where the internal phase volume is lower than the 74.05% HIPE limit. Specifically, the hydrophilic polymeric beads can dissolve easily in solvents such as water and can release any active substances contained within the framework very quickly. The hydrophilic polymeric beads contain a macro-porous structure that may aid dissolution of the beads in use. The beads thus obtained are highly porous with regular pores. The pores are preferably interconnected and open to the surface. The beads can be spherical and the particle size of the beads can be controlled very closely. Unlike other HIPE based porous beads, the beads of the present invention need not be cross-linked, although for certain applications, it may be desirable chemically to cross-link the polymeric component by a cross-linking agent. In one preferred embodiment of the invention the bead morphology includes surfactant moieties and the surfactant is integrated throughout the structure of the bead. It will be apparent that the bead morphology will lend itself to a number of applications in the biomedical and chemical fields such as labels or sensing-device carriers, affinity chromatography, immobilisation of enzymes, drug delivery and cleaning agents for Example.

In accordance with another aspect of the present invention, there is provided a method for producing porous hydrophilic polymeric beads comprising the steps of:

a) providing an emulsion comprising an aqueous phase, an organic phase and a hydrophilic polymeric material;

b) providing a fluid medium at a temperature effective for freezing the emulsion;

c) contacting droplets of the emulsion with the fluid medium for a period effective to form frozen droplets;

d) isolating the frozen droplets; and e) freeze-drying the droplets to form beads.

Additionally, the above method for producing porous hydrophilic polymeric beads may also include a cross-linking step wherein the beads are chemically cross-linked by a cross-linking agent. The porous beads can be cross-linked after freeze-drying in order to enhance their mechanical strength or to change their solubility characteristics. The choice of cross-linking agent will vary with the polymeric material. The amount of cross-linking agent may also vary with the amount of polymeric material present in the beads and the level of cross-linking desired. A number of well-known chemical cross-linking agents are available for use in the cross-linking step. A cross-linking agent may for Example be selected from diamines and polyamines that cross-link hydroxyl and/or carboxylic moieties along the polymer backbone. Preferred cross-linking agents include diisocyanate compounds, which may be aliphatic, cycloaliphatic or aromatic. Particularly preferred cross-linking agents include 2,4-tolylene diisocyanate, 4,4-diphenyl methane diisocyanate and 1,4-phenylene diisocyanate.

Preferably, the emulsion comprises an emulsifier. The emulsion may comprise a continuous aqueous phase with the hydrophilic polymeric material dissolved therein and a discontinuous organic phase. The emulsion may also comprise an oil in water high internal phase emulsion. Alternatively, the emulsion may comprise a water in oil high internal phase emulsion. Furthermore, the emulsifier may be selected from one or more of the following surfactants; nonionic, cationic, anionic or amphoteric surfactants. The surfactants may be removed after bead formation by washing or by calcination (in the case of organic/inorganic composites).

It will be evident to those skilled in the art that substances that are known to promote the formation of a stable emulsion, especially a stable oil/water HIPE can also be used. The preferred emulsifier is sodium dodecyl sulphate. It is preferred that the emulsifier is present in the continuous phase in a concentration of about 1% to about 60% by weight. More preferably, the emulsifier is present in the continuous phase in a concentration of about 2% to about 40% by weight and a yet more preferred concentration is about 5% to about 25% by weight In accordance with yet a further aspect of the present invention, there is provided a method for producing porous hydrophilic polymeric beads as previously described, wherein the polymeric material is selected from one or more from the following group of polymers; poly(vinyl alcohol), poly(ethylene glycol), poly(ethylene oxide), poly(vinyl pyrrolidone), poly(acrylic acid), poly(acrylic acid)-sodium salt, poly(acrylamide), poly(sodium styrene sulfonate), poly(2-acrylamido-2-methyl-1-propanesulfonic acid) and polysaccharides. The strength, hydrophilicity, or other properties of the beads can be adjusted by choosing different polymers, different polymer concentrations, or a different volume ratio of internal phase. The polymer can be selected from a wide range of substantially oil-soluble polymers, for Example, polystyrene, polycarbonate, polyacrylates, polylactic acid, polyglycolic acid, and polycaprolactone. Dissolution of the composite beads can give rise to an aqueous dispersion or 'latex' of the oil-soluble polymer in water. Preferably, the polymeric material is present in the continuous phase in a concentration of about 1% to 50% by weight. Even more preferably, the polymeric material is present in the continuous phase in a concentration of about 3% to 10% by weight.

Another aspect of the present invention provides a method for producing porous hydrophilic polymeric beads as previously described wherein the discontinuous organic phase comprises an organic solvent. The organic solvent may be selected from one or more from the following group of organic solvents; heptane, n-hexane, isooctane, dodecane, decane, toluene, xylene, cyclohexane, mineral oil, dichloromethane, dichoroethane and tetrachloroethane. Preferably, the organic solvent comprises from about 20% to about 95% v/v of the emulsion, more preferably from about 50% to about 90%. For Example, the organic solvent may be present in an amount of from about 50% v/v or more in the emulsion. More preferably, the organic solvent is present in an amount of from about 74% v/v or more in the emulsion. The organic solvent in the internal phase may include an oil-soluble dye and/or other oil-soluble molecules. Preferably, dichloromethane is used as a solvent due to its low boiling point and high vapour pressure. Another preferred solvent is cyclohexane as the melting point of cyclohexane is higher than that of water and the specific heat capacity for cyclohexane is much lower than that of water. This induces rapid freezing of the emulsion droplets. Because of the higher melting point of cyclohexane, the frozen emulsion droplets can be freeze-dried at various temperatures within the range of from about −196° C. to about −10° C.

In accordance with yet another aspect of the present invention, there is provided a method for producing porous hydrophilic polymeric beads wherein the aqueous phase may include inorganic salts or silica colloids. Alternatively, the aqueous phase may include a water-soluble dye or other water-soluble molecules or metal nanoparticles. If metal nanoparticles are added to the aqueous solution nanoparticle/polymer composite beads can be obtained. If the nanoparticles are subsequently selectively extracted, nanosize cells are left within the templated pore structure. Alternatively, the metal nanoparticles may be redispersed into an aqueous solution by rapid dissolution of the porous polymer bead.

It may be desirable in end-use of the beads to incorporate an active ingredient in the porous structure of the bead. This may be achieved by providing one or more such additives in one or more of the aqueous solution, the organic solvent, the emulsion, or the freezing medium. Such additives may include, for Example, pharmaceutical agents, enzymes, dyes, cleaning agents, bleaching agents, fabric softening agents, clothes care agents, oxidising agents, reducing agents, flavours, fragrances, metal nanoparticles, vitamins and nutraceuticals. It will be apparent to those skilled in the art that other additives in the biological and chemical fields may also be utilised in the present method. Preferably, the concentration of the additive is from about 1% to about 50% by weight of the aqueous solution, the organic solvent, the emulsion, or the freezing medium, as the case may be, and even more preferably from about 10% to about 30% by weight thereof. If enzymes are used as an additive, they can be added to either the aqueous solution or the oil phase. The enzymes will become entrapped within the polymer matrix of the obtained porous beads and the activity of enzyme should be retained after freezing and freeze-drying.

A substantially water-soluble inorganic or organic additive may be dissolved in the aqueous continuous phase in order to enhance the strength of the polymer beads or to form a highly porous inorganic skeleton after subsequent calcinations at elevated temperatures. Water-soluble structural additives may include, but are not limited to: partially hydrolysed silica precursors (i.e., a silica 'sol'), other alkoxide sols, and sodium silicate. Alternatively, a water-soluble additive may be added with the purpose of delivering this additive into an aqueous solution upon dissolution of the bead. The water-soluble additive may be selected from a very wide range of substantially water-soluble compounds such as, pharmaceutical actives, dyes, oxidising agents, reducing agents, flavours, fragrances, and vitamins or nutraceuticals. Water-soluble additives can be used singly or as mixtures.

Alternatively, a substantially water-insoluble inorganic or organic additive may be dispersed in the aqueous continuous phase in order to enhance the strength of the polymer beads or to form a highly porous inorganic skeleton after calcination. A water-insoluble structural additive may include, silica nanoparticles, metal nanoparticles, clay dispersions, and other dispersions of particulate inorganic fillers. Alternatively, a water-insoluble additive may be added with the purpose of dispersing this additive into an aqueous solution upon dissolution of the bead. The water-insoluble additive may be selected from a very wide range of substantially water-insoluble compounds that can be dispersed in the aqueous phase of the emulsion. Such a water-insoluble additive may be selected from one or more of the following group; water-insoluble pharmaceutical actives, water-insoluble dyes, water-insoluble oxidising agents, water-insoluble reducing agents, water-insoluble flavours, and water-insoluble fragrances.

A substantially oil-soluble inorganic or organic additive may be dissolved in the oil discontinuous phase with the purpose of delivering this additive into an aqueous solution upon dissolution of the bead. The oil-soluble additive may be deposited as fine particles within the porous bead structure after freeze-drying. The oil-soluble additive can be selected from a very wide range of substantially oil-soluble compounds and may be selected from one or more of the following group; pharmaceutical actives, dyes, oxidising agents, reducing agents, flavours, fragrances, oil-soluble metal nanoparticles, and vitamins or nutraceuticals. Alternatively, the oil phase itself may be a high-boiling point liquid chosen with the purpose of delivering this oil as fine droplets into an aqueous solution upon dissolution of the bead.

A substantially oil-insoluble inorganic or organic additive may be dispersed in the oil discontinuous phase with the purpose of delivering this additive into an aqueous solution upon dissolution of the bead (e.g., veobtainable oils, edible oils, perfume oils). The oil-insoluble additive may be deposited as fine particles within the porous bead structure after freeze-drying. The oil-insoluble additive can be selected from a very wide range of substantially oil-insoluble compounds and may comprise one or more of the following group; oil-insoluble pharmaceutical actives, oil-insoluble dyes, oil-insoluble oxidising agents, oil-insoluble reducing agents, oil-insoluble flavours, and oil-insoluble fragrances.

In the process of the invention the fluid medium is preferably inert to the polymeric material. Preferably, the fluid medium is at a temperature below the freezing point of the various components of the emulsion and is preferably at a much lower temperature to facilitate rapid freezing. The fluid medium is preferably a liquified substance which is a gas or vapour at standard temperature and pressure. It is desirable that the fluid medium is maintained at a temperature in the range of −10° C. to −196° C. The fluid medium may be selected from one or more of the following group; liquid nitrogen, liquid ammonia, liquified noble gas such as argon, liquefied chlorinated hydrocarbon such as trichloroethylene, chlorofluorocarbon, freon, hexane, dimethylbutene, isoheptane or cumene. The frozen beads may be directly dried when contacted with liquid nitrogen. Furthermore, the frozen beads may be contacted with a vacuum whilst being directly dried. Alternatively, the frozen beads may be transferred into a freeze-drier for drying. Due to the very low boiling temperature, inertness, ease of expulsion and economy, liquid nitrogen is the preferred fluid medium.

The emulsions are typically prepared under strong shear condition by using a magnetic stirring bar, a homogenizer, or a rotator mechanical stirrer. Properties of porous beads of the present invention, such as pore size, pore size distribution and number of windows may be influenced by the agitation methods or agitation speeds used to make the emulsions, and by the surfactant concentration.

After the emulsion has been prepared, it is injected or sprayed into a freezing fluid medium. A spray of such droplets can be formed in a known manner, for Example, by passing the emulsion through a spinning disc atomiser, a vibrating acoustically modulated nozzle, a concentric blown nozzle, or a simple gravity dripping feed. When using a vibrating acoustically modulated nozzle, the droplets are preferably deflected sideways by electrostatic charging to prevent drop collision. In one preferred process of the invention, the emulsion is injected into a vertically-mounted glass vessel containing fluid freezing medium. The injection is performed continuously through a needle using a syringe pump. The droplet size can be varied by varying the needle diameter. The injection rate may be adjusted to obtain well defined individual beads. The average bead diameter is preferably 0.2–5 mm, more preferably 0.5–4 mm, most preferably 0.5–3 mm. The standard deviation in bead diameter is preferably 0.2–15%, more preferably 0.5–10%, most preferably 1–3%.

In the present invention, a thermostatic vessel is filled with a fluid medium. A smaller glass vessel is put inside this thermostatic vessel. The small glass vessel is filled with fluid medium. The emulsion is then injected or sprayed into the small glass vessel. Once the emulsion is injected into liquid nitrogen the droplets float for a brief time on the meniscus of the boiling liquid. After being completely frozen, the droplets sink in the liquid medium to the bottom of the small glass vessel.

The frozen beads may be freeze-dried by exposing the small glass vessel to high vacuum while still cooling the surrounding thermostated vessel. Alternatively, the frozen beads may be freeze-dried in a commercial freeze-drier at various temperatures by transferring the frozen-beads from the small glass vessel. The freeze-drying step may be performed for around 72 h in order to obtain dried porous beads.

The porous beads produced usually comprise of two types of pores. One is from the sublimation of solid ice. This pore structure can be varied by varying the polymer, the polymer molecular weight, the polymer concentration, the nature of the internal phase, the freezing temperature, or the freeze-drying temperature. Another kind of pore structure results from the structure of the frozen emulsion template. These structures can be varied by controlling the structure of the template emulsion, as described above.

There are two sizes of pores on the bead surface, one of which results from the emulsion template, the other resulting from sublimation of solid ice. The pores are not only interconnected within the bead structure but also connected to the open porous surface.

In the absence of chemical cross-linking after drying, the highly porous hydrophilic beads can dissolve very rapidly (<1 second) in water at ambient temperature. This may be useful for rapid release of additives entrapped within the pore structure, specific Examples of which are described in above.

Inorganic/polymer composite porous beads (including inorganic salts or silica colloidal) may be calcined after freeze drying to remove the organic phase. Skeletal porous inorganic beads are obtained from this process. Suitable uses include storage and transport of chemicals; support application, e.g., catalytic reactions or filter media; and insulation and separation applications.

The method for producing porous beads according to the present invention, will now be more particularly described, by way of Example only, with reference to the accompanying Examples and images.

FIG. 1, shows an optical microscope image of the beads produced in Example 1.

FIG. 2, shows a high magnification (×4000) electron micrograph of the surface of a bead produced in Example 1.

FIG. 3, shows a low magnification (×1500) electron micrograph of the internal structure of a bead produced in Example 1.

FIG. 4, shows a low magnification (×1000) electron micrograph of the surface interface of a sectioned bead produced in Example 1.

FIG. 5, shows a series of time-lapse optical microscope images monitoring the dissolution process for a single bead as produced in Example 1.

FIG. 6, shows a high magnification (×2500) electron micrograph the internal structure of a sectioned bead produced in Example 2.

FIG. 7, shows a low magnification (×1250) electron micrograph of the internal structure of a sectioned bead produced in Example 3.

FIG. 8, shows a high magnification (×2500) electron micrograph of the internal structure of a sectioned bead produced in Example 3.

FIG. 9, shows a low magnification optical image of the beads produced in Example 5.

FIG. 10, shows an image of the oil soaked beads produced in Example 5 dissolving in a tube of distilled water.

FIG. 11, shows a low magnification (×1000) electron micrograph of the internal structure of a bead produced in Example 6.

FIG. 12, shows an image of the beads produced in Example 7.

FIG. 13, shows a low magnification (×200) electron micrograph of the internal structure of a bead produced in Example 8.

FIG. 14, shows a low magnification (×500) electron micrograph of the internal structure of a bead produced in Example 9.

FIG. 15, shows an image of the beads produced in Example 11.

FIG. 16, shows a transmission electron microscopy grid image of metal nanoparticles released from dissolution of a bead produced in Example 11 after the solution was evaporated.

FIG. 17, shows an image of the beads produced in Example 13.

FIG. 18, shows an image of the beads produced in Example 18

FIG. 19, shows a low magnification (×100) electron micrograph of the internal structure of a bead produced in Example 20.

FIG. 20, shows a high magnification (×2000) electron micrograph of the internal structure of a bead produced in Example 23.

FIG. 21, shows an image of an aqueous latex of PS particles released from dissolution of beads produced in Example 23.

Figure 23:
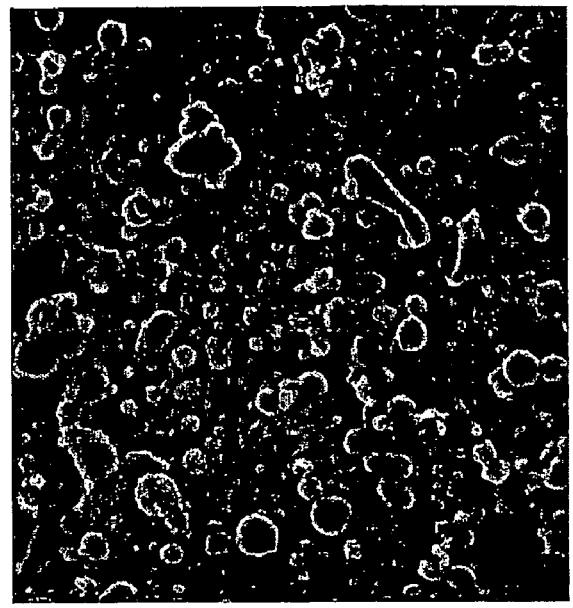
FIG. 23, shows an electron micrograph of Poly(DL-lactide-co-glycolide) (PLGA) particles deposited on an aluminium stub after evaporation of the latex formed in Example 25.

The imaging of the beads by optical microscopy was performed using low magnification (usually ×10). All of the beads in the Examples were found to be quite uniform and spherical.

Scanning electron micrographs of the beads were made on a Hitachi machine scanning electron microscope. The beads were not treated in any way apart from coating with approximately 10 nm of gold prior to observing the bead surfaces by SEM. In order to observe the internal porous structure, beads were cut in half with a razor blade.

Bead bulk density, pore volume and average pore diameter were determined by mercury porosimetry. Samples were first degassed for at least 24 h in a high vacuum at room temperature. Measurements were recorded on a Autopore 9500 mercury porosimeter manufactured by Micrometrics.

EXAMPLE 1

An experiment was conducted in order to produce PVA porous beads with a 75% internal phase. Hydrophilic polymer porous beads were prepared by injecting emulsion into liquid nitrogen. The emulsion comprised an aqueous continuous phase (containing the polymer) and an oil discontinuous phase. The components and amounts in this study are indicated in Table 1.

TABLE 1

| PVA 5 wt % aqueous solution: | 2.0 ml |
| Sodium dodecyl sulphate (98%): | 0.31 g |
| Dichloromethane: | 6.0 ml |

Poly(vinyl alcohol) (PVA, Mw=9,000–10,000 g/mol, 80% hydrolysed) was first added to deionized water to produce a PVA 5 wt % solution. During stirring with a type RW11 Basic IKA paddle stirrer, the surfactant and dichloromethane were added to form a high-internal phase emulsion (HIPE).

A small round bottom bottle was placed in a thermostatic vessel and liquid nitrogen was then poured into both containers. The emulsion was then injected into the liquid nitrogen of the small bottle using a A-99 FZ Razel syringe pump through a 0.6 mm×25 mm needle. The injection was adjusted in order to obtain separate beads.

After injection, the small bottle was connected directly to a vacuum system while maintaining liquid nitrogen in the thermostatic vessel. The freeze-drying lasted for at least 72 h and resulted in dry, white beads being produced in a 100% yield.

FIG. 1 shows an optical microscope image of the beads produced. The mean bead diameter was found to be 2.52 mm and the standard deviation in bead diameter was 2.83%. The bulk density was 0.0754 g/cm$^3$.

FIG. 2 shows the surface of a bead at high magnification. FIG. 3 shows the internal structure of a sectioned bead, also at high magnification. FIG. 4 shows the surface interface of a sectioned bead. It is clear from these results that the pores of the bead are interconnected and surface-opened.

When these beads were dropped into distilled water at 25° C., they were observed to dissolve very rapidly without agitation to leave a clear, homogeneous solution. FIG. 5 shows a series of time-lapse optical microscope images monitoring the dissolution process for a single bead. The first image (t=0 sec) corresponds to the time at which the water first contacts the bead and the last image (t=3.8 sec) shows that the bead has almost completely dissolved. The very rapid dissolution process results from a combination of the particular porous structure, the large pore volume, and the fact that the pores are interconnected and open to the bead surface. Comparable samples with lower levels of porosity dissolve much more slowly (see Examples 2 and 3).

Further experiments were conducted resulting in Examples 2–22. Each experiment was conducted with the same size needle and the same syringe pump.

EXAMPLE 2

An experiment was conducted in order to produce PVA porous beads with a 50% internal phase. Table 2 shows the components in this experiment. PVA (Mw=9,000–10,000 g/mol, 80% hydrolysed). The same grade of PVA is used in all of the following Examples, unless otherwise indicated.) The same procedure as described in Example 1 was used to prepare the beads.

TABLE 2

| PVA 5 wt % aqueous solution: | 4.0 ml |
| Sodium dodecyl sulphate (98%): | 0.60 g |
| Dichloromethane: | 4.0 ml |

FIG. 6 shows the internal structure of a sectioned bead. Two kinds of pores were observed. The small size fishbone-like pore structure arose from the sublimation of solid ice and this feature was also observed in samples prepared without the emulsion phase (see Example 3). The larger, spherical structures result from templating of the frozen emulsion droplets.

EXAMPLE 3

Comparative

An experiment was conducted in order to produce PVA porous beads without an emulsion template. An aqueous solution of PVA (9,000–10,000 g/mol, 10 wt %) was prepared and the solution was injected directly into liquid nitrogen. No emulsion phase was present in the experiment. After freeze-drying, white uniform PVA beads were obtained. Again, the beads could dissolve in water at 25° C., but the dissolution was significantly slowly than the more highly porous emulsion-templated beads formed in Example 1.

FIG. 7 is a low magnification scanning electron microscope image, which shows an array of aligned pores in the beads produced in this experiment. FIG. 8, further shows the fish-bone-like porous structure in more detail. This type of porosity, is distinct from the emulsion-templated structures observed in Examples 1 and 2 and arises from sublimation of frozen ice crystals in the materials during freeze drying.

EXAMPLE 4

An experiment was conducted in order to produce PEG porous beads with a 50% internal phase. Table 3 shows the components and amounts used in this experiment. Poly (ethylene glycol) (PEG, average Mw=8.000 g/mol) was dissolved in deionized water to prepare a 15.35 wt % solution. This solution was emulsified with dichloromethane, using the previous procedure as before, and injected into liquid nitrogen.

TABLE 3

| PEG 15.35 wt % aqueous solution: | 4.0 ml |
| Sodium dodecyl sulphate (98%): | 0.60 g |
| Dichloromethane: | 4.0 ml |

The frozen beads were freeze-dried by bringing them into contacting with liquid nitrogen for 48 h, followed by further freeze-drying on dry ice for another 48 h. The temperature was then allowed to rise to room temperature under a vacuum. Uniform dry white beads were produced.

The beads dissolved very readily in distilled water at 25° C. The internal structure of the beads contained two kinds of pores similar to the structures observed in the sample described in Example 2. It was also found that the pores on the surface were interconnected with the internal structure.

The mean bead size was 2.51 mm. The standard deviation in bead diameter was 6.57%. The bulk density was 0.182 g/cm$^3$.

EXAMPLE 5

An experiment was conducted in order to produce PEG porous beads with an 80% internal phase and to encapsulate a water-soluble dye within the bead. The procedure from Example 1 was followed and table 4 shows the components and amounts used in this experiment.

TABLE 4

| | |
|---|---|
| PEG 15.35 wt % aqueous solution: | 2.0 ml |
| Methyl orange: | 0.006 g |
| Sodium dodecyl sulphate (98%): | 0.30 g |
| Dichloromethane: | 8.0 ml |

A water-soluble dye, methyl orange, was added to the aqueous solution. The gradual addition of dichloromethane to the aqueous solution while stirring resulted in a stable, yellow emulsion being formed. The emulsion was then injected slowly into liquid nitrogen. Freeze-drying the frozen beads in contact with liquid nitrogen resulted in dry, uniformly sized, pale yellow beads being produced in a 100% yield.

FIG. 9 shows a low magnification optical image of the beads. The beads were found to dissolve rapidly in water to give a homogeneous, bright orange solution.

The beads were not found to be soluble in organic solvents, e.g., toluene, dichloromethane. A sample of the beads were weighed. The 8 beads weighed 0.0058 g and the beads were then placed in light mineral oil. After soaking for 30 minutes, the beads were removed from the oil and excess oil was wiped from the bead surfaces with tissue paper. The beads were then weighed again and the mass of the oil-soaked beads was 0.0416 g. This corresponds to a mass increase of 717%, demonstrating that material comprising the beads were very capable absorbents.

The oil-soaked beads were then placed in 2 ml of distilled water at 25° C. The beads were observed to dissolve very rapidly, releasing both the water-soluble dye and the oil phase to form a yellow solution, as shown in FIG. 10. The oil was not observed to separate out as a separate phase and appeared to form a highly dispersed oil-in-water suspension that was stable without agitation. The dissolved poly(ethylene glycol) may act as a surfactant. It was postulated that the fact that the oil is encapsulated in micron-size emulsion-templated domains within the bead structure may assist in the release of the oil as a fine dispersion upon dissolution. This Example demonstrates the simultaneous release of a hydrophilic and a hydrophobic additive from a porous bead composite.

The mean bead size was 2.56 mm. The standard deviation in bead diameter was 2.93%. The bulk density was 0.079 g/cm$^3$. The intrusion volume is 8.96 ml/g.

EXAMPLE 6

Comparative

An experiment was conducted in order to produce PE-PEO porous beads without an emulsion template. In principle, an amphiphilic block copolymer can be used as both a surfactant (to stabilize the emulsion) and as the polymer matrix itself. Poly(ethylene-b-ethylene oxide) (EO content 50%, Mw 1,400 g/mol) was dissolved in water to form a saturated solution at 15° C. This solution was injected directly into liquid nitrogen (without an emulsion template phase). After freeze-drying, white uniform beads were obtained.

FIG. 11 shows the internal structure of the bead. The structure was found to be very different from that of PVA beads prepared under similar conditions.

EXAMPLE 7

An experiment was conducted in order to produce PVA/PAA-Na porous beads with 50% internal phase. Table 5 shows the components and amounts used in this experiment.

TABLE 5

| | |
|---|---|
| Poly(acrylic acid, sodium salt) 10 wt % solution: | 2.0 ml |
| Sodium dodecyl sulphate (98%): | 0.40 g |
| PVA 5 wt % solution: | 2.0 ml |
| Dispersion Red 1/Dichloromethane solution: | 4.0 ml |

A solution of an oil-soluble dye, Disperse Red 1, was prepared in dichloromethane (0.11 wt % dye). A PVA solution (5 wt %, 2.0 ml) was mixed with sodium dodecyl sulphate (0.40 g) and poly(sodium acrylate) solution (2 ml, 10 wt % in water, Mw=5,100 g/mol). The deep-red coloured dichloromethane solution was used as the internal phase, and a deep-red emulsion was obtained by mixing. The emulsion was injected slowly into liquid nitrogen and the emulsion structure was locked-in by rapid freezing. After freeze-drying, uniform, red beads were obtained. FIG. 12 shows an optical image of these beads.

A bead then was placed in water at 25° C., resulting in the bead dissolving very rapidly. The water-insoluble dye was dispersed in the water as very fine particles that did not settle out within one hour.

Another bead was then placed in dichoromethane at 25° C., which resulted in the bead not dissolving. The bead was found to have a tendency to float on the dichloromethane meniscus. The bead surface quickly became very deeply red upon contact with the organic solvent. The red colour diffused with time throughout the dichloromethane, eventually to give a homogenous red solution.

The mean bead size was 2.38 mm. The standard deviation in bead diameter was 4.67%. The bulk density was 0.1316 g/cm$^3$.

EXAMPLE 8

An experiment was conducted in order to assess the internal structure of porous silica beads when injected into liquid nitrogen. A solution of LUDOX silica colloidal (silica content=50%) was injected directly into liquid nitrogen. After freeze-drying, uniform white beads were obtained. The internal structure is shown in FIG. 13. These beads were found to be insoluble in water. The surface area of the beads was 119 m$^2$/g, similar to that observed for the colloidal silica (~140 m²/g). The mean bead size was 2.92 mm. The standard deviation in bead diameter was 7.54%. The bulk density was 0.65 g/cm³.

EXAMPLE 9

An experiment was conducted in order to produce PVA/Zn(NO3)2 composite porous beads with 66% internal phase. Table 6 shows the composition of the emulsion in this Example.

TABLE 6

| | |
|---|---|
| PVA 5 wt % aqueous solution: | 1.0 ml |
| Sodium dodecyl sulphate (98%): | 0.30 g |
| Zn(NO3) 2.6 H2O 20 wt % solution: | 1.0 ml |
| Cyclohexane: | 4.0 ml |

The inorganic/polymer porous composite beads were prepared by emulsion templating, as described in previous Examples. Cyclohexane was used as an internal phase due to its high melting point (6.5° C.). Because of this, the emulsion containing droplets were found to freeze more rapidly than samples prepared using dichloromethane. In addition to this, the freeze-drying process could also be conducted at higher temperatures using a commercial freeze drying unit.

FIG. 14 shows the internal structure of the beads, which is a replica of the structure of the emulsion prior to freezing.

The mean bead size was 2.36 mm. The standard deviation was 5.61%. The bulk density was 0.159 g/cm³.

EXAMPLE 10

An experiment was conducted in order to produce PVP porous beads with 75% internal phase. Table 7 shows the composition of the emulsion in this Example.

TABLE 7

| | |
|---|---|
| Polyvinylpyrrolidone 10 wt % solution: | 2.0 ml |
| Sodium dodecyl sulphate (98%): | 0.30 g |
| Cyclohexane: | 6.0 ml |

Another water-soluble polymer, polyvinylpyrrolidone (PVP K12, Mw=3,500 g/mol) was used to make porous beads, using the same process as outlined in previous Examples.

The emulsion was injected into liquid nitrogen and then transferred while frozen into a freeze-drier at −60° C. White uniform porous beads were obtained by this method.

The mean bead diameter was 2.64 mm. The standard deviation in bead diameter was 4.10%. The bulk density was 0.061 g/cm³.

EXAMPLE 11

An experiment was conducted in order to produce PEG/metal nanoparticle composite porous beads. Gold nanoparticle/poly(ethylene glycol) composite beads were prepared in this experiment. Gold nanoparticles (50 mg) were dissolved in 10 ml deionised water. The resultant colour of the solution was dark red. Poly(ethylene glycol) (250 mg, Mw=8,000 g/mol) was then dissolved in 4 ml of this nanoparticle solution. This solution was injected directly into liquid nitrogen and then transferred into a freeze-drier.

The collected dry beads were purple in colour. This colour suggested that the nanoparticles were not aggregated within the structure. FIG. 15 shows an image of the purple beads and illustrates that the colour was consistently spread throughout the beads, which suggested that the gold nanoparticles and the poly(ethylene glycol) were also consistently mixed throughout the bead. A single bead was dissolved in methanol and a resulting pale red solution was evaporated on a transmission electron microscopy (TEM) grid. FIG. 16 shows a TEM image obtained from this grid, demonstrating that the particles were redispersed from the bead into solution without aggregation. The average nanoparticle diameter was around 10 nm. These composite beads dissolved readily in water. The mean bead diameter was 3.13 mm. The standard deviation in bead diameter was 4.51%. The bulk density was 0.060 g/cm³.

EXAMPLE 12

An experiment was conducted in order to produce PVA/silica-particle composite porous beads with 50% internal phase. Table 8 shows the composition of the emulsion used in this experiment.

TABLE 8

| | |
|---|---|
| PVA 5 wt % solution: | 2.5 ml + 2.0 ml |
| Sodium dodecyl sulphate (98%): | 0.45 g |
| LUDOX silica colloidal: | 0.5 ml |
| Cyclohexane: | 6.0 ml |

Into an aqueous PVA solution (5 wt %, 2.5 ml), 0.45 g of sodium dodecyl sulphate and 0.5 ml of LUDOX silica colloid solution (SiO2, 50%) was dissolved. The resulting solution had the appearance of a paste. A further 2.0 ml of the PVA solution (5 wt %) was then added to the solution. Into this solution cyclohexane (6.0 ml) was emulsified by stirring to form a stable white emulsion.

The emulsion was injected into liquid nitrogen and the frozen beads transferred into a freeze-drier. SEM pictures analysis showed that the emulsion structure was templated in the bead. The beads dissolved rapidly in water to release the silica colloid particles. The mean bead diameter was 2.58 mm. The standard deviation in bead diameter was 4.89%. The bulk density was 0.108 g/cm³.

EXAMPLE 13

An experiment was conducted in order to produce silica-particle porous beads with 75% internal phase. Table 9 shows the composition of the emulsion used in this experiment.

TABLE 9

| | |
|---|---|
| Deionized water: | 2.0 ml |
| Sodium dodecyl sulphate (98%): | 0.30 g |
| LUDOX silica colloidal: | 0.2 ml |
| Cyclohexane: | 7.0 ml |

A LUDOX silica colloid (SiO2, 50%) solution was added to a SDS/water solution. The resulting solution had a blue appearance. This solution was emulsified with cyclohexane, as outlined in Example 12.

The emulsion was injected into liquid nitrogen and the frozen beads transferred into a freeze-drier.

FIG. 17 shows an optical image of the collected beads. Further analysis by using a SEM showed that the emulsion structure was templated to form a highly porous material. These beads were also found to dissolve rapidly in water to release the silica colloid. The mean bead diameter was 3.04 mm. The standard deviation in bead diameter was 4.14%. The bulk density was 0.047 g/cm$^3$. The intrusion volume is 16.03 ml/g.

EXAMPLE 14

An experiment was conducted in order to produce PVA/silica-particle porous beads with 75% internal phase. Table 10 shows the composition of the emulsion used in this experiment.

TABLE 10

| | |
|---|---|
| Deionized water: | 1.5 ml |
| LUDOX silica colloidal: | 0.2 ml |
| PVA 5 wt % solution: | 0.5 ml |
| Sodium dodecyl sulphate (98%): | 0.30 g |
| Cyclohexane: | 7.0 ml |

Uniform white beads were collected. The emulsion structure was templated to form highly porous beads. These beads were found to be insoluble in water. The mean bead size was 2.50 mm. The standard deviation in particle diameter was 5.21%. The bulk density was 0.078 g/cm$^3$. The intrusion volume is 9.78 ml/g.

EXAMPLE 15

An experiment was conducted in order to produce PVA/Zn(NO3)2 porous beads with 75% internal phase. Table 11 shows the composition of the emulsion produced in this experiment.

TABLE 11

| | |
|---|---|
| PVA 5 wt % solution: | 1.0 ml |
| Sodium dodecyl sulphate (98%): | 0.30 g |
| Zn(NO3)2.6 H2O 20 wt % solution: | 1.0 ml |
| Cyclohexane: | 7.0 ml |

The emulsion was injected into liquid nitrogen and the frozen beads then transferred into a freeze-drier.

The collected beads were white and exhibited an open, porous, emulsion-templated internal structure with many open pores on the bead surface. The beads were found to dissolve readily in water.

The mean bead diameter was 2.15 mm. The standard deviation in bead diameter was 7.01%. The bulk density was 0.159 g/cm$^3$.

EXAMPLE 16

An experiment was conducted in order to produce PVA/PAA-Na porous beads with 80% internal phase. Table 12 shows the composition of the emulsion in this Example.

TABLE 12

| | |
|---|---|
| PVA 5 wt % solution: | 1.0 ml |
| Sodium dodecyl sulphate (98%): | 0.30 g |
| Poly(acrylic acid, Na salt)(Mw = 5,100 g/mol), 10 wt % solution: | 1.0 ml |
| Cyclohexane: | 8.0 ml |

The emulsion was injected into liquid nitrogen and the frozen beads transferred into a freeze-drier. The collected beads were white and exhibited an open, porous, emulsion-templated internal structure with many open pores on the bead surface. The beads were also found to dissolve readily in water. The mean bead diameter was 2.70 mm. The standard deviation in bead diameter was 4.96%. The bulk density was 0.071 g/cm$^3$.

EXAMPLE 17

An experiment was conducted in order to produce PAA, Na porous beads with 80% internal phase. Table 13 shows the composition of the emulsion in this Example.

TABLE 13

| | |
|---|---|
| Deionized water: | 1.0 ml |
| Sodium dodecyl sulphate (98%): | 0.30 g |
| Poly(acrylic acid, Na salt)(Mw = 5,100 g/mol), 10 wt % solution: | 1.0 ml |
| Cyclohexane: | 8.0 ml |

The emulsion was injected into liquid nitrogen and the frozen beads transferred into a freeze-drier. The collected beads were white and exhibited an open, porous, emulsion-templated internal structure with many open pores on the bead surface. The beads dissolved readily in water. The mean bead diameter was 2.79 mm. The standard deviation in bead diameter was 3.22%. The bulk density was 0.046 g/cm$^3$. The intrusion volume is 17.24 ml/g.

EXAMPLE 18

Comparative

An experiment was conducted in order to produce PSS porous beads without emulsion template. An aqueous solution of poly(sodium-4-styrenesulfonate) (PSS, 20 wt % in water) was injected directly into liquid nitrogen. The beads were collected after freeze-drying. FIG. 18 shows an optical image of the beads. The internal structure of the beads is similar to that of the PVA beads prepared in Example 3 but somewhat less porous. The beads were mechanically rigid and dissolved slowly in water. The mean bead diameter was 2.74 mm. The standard deviation in bead diameter was 4.07%. The bulk density was 0.247 g/cm$^3$.

EXAMPLE 19

An experiment was conducted in order to produce PSS porous beads with 80% internal phase. Table 14 shows the composition of the emulsion in this Example.

TABLE 14

| | |
|---|---|
| Deionized water: | 1.0 ml |
| Sodium dodecyl sulphate (98%): | 0.20 g |
| PSS 20 wt % solution: | 1.0 ml |
| Cyclohexane: | 8.0 ml |

The emulsion was prepared according to Table 14. The emulsion was very stable and had a very pale yellow appearance. The emulsion was injected into liquid nitrogen and the frozen beads were then freeze-dried in a commercial freeze-drier. Uniform beads were collected with a porous emulsion-templated structure. The beads were found to dissolve very easily in water. The mean bead diameter was 2.93 mm. The standard deviation was 6.23%. The bulk density was 0.049 g/cm$^3$. The intrusion volume is 15.94 ml/g.

EXAMPLE 20

An experiment was conducted in order to produce Beads from a tetraethylorthosilicate (TEOS) solution. Table 15 shows the composition of the emulsion in this Example.

TABLE 15

| | |
|---|---|
| Deionized water: | 1.0 ml |
| Hexadecyltrimethylammonium bromide: | 0.12 g |
| TEOS Sol: | 1.0 ml |
| Cyclohexane: | 7.0 ml |

A TEOS solution was prepared by a sonification method and stored in a freezer at about −20° C. A small amount of HCl solution was added during the preparation of the emulsion. The emulsion was found to have a limited stability and only a few beads were prepared by this method. The internal structure of the beads after freeze-drying is shown in FIG. 19.

EXAMPLE 21

An experiment was conducted in order to produce PVA/Na2SiO3 porous beads with 75% internal phase. Table 16 shows the composition of the emulsion produced in this Example.

TABLE 16

| | |
|---|---|
| Deionized water: | 1.0 ml |
| Sodium dodecyl sulphate (98%): | 0.20 g |
| Na2SiO3 Solution: | 1.0 ml |
| PVA 5 wt % solution: | 1.0 ml |
| Cyclohexane: | 9.0 ml |

The Na2SiO3 solution was used as received from Aldrich. A stable emulsion was prepared according to the recipe shown in Table 16. When injected into liquid nitrogen, the emulsion containing droplets were frozen very quickly. After freeze-drying, uniform white beads were collected. The internal and surface structures were similar to previous Examples, although the beads were found to be insoluble in water. The mean bead diameter was 2.71 mm. The standard deviation in bead diameter was 4.67%. The bulk density was 0.104 g/cm$^3$. The intrusion volume is 7.09 ml/g.

EXAMPLE 22

An experiment was conducted in order to develop a Cross-linking Process for PVA and PEG porous beads. The majority of the beads prepared by this method had a relatively low mechanical strength and were highly water-soluble. By chemically cross-linking the polymer, the mechanical strength can be increased and the materials rendered insoluble.

A sample of the porous PVA beads prepared in Example 1 (0.0815 g) was added to toluene (50 ml). A cross-linker, tolylene 2,4-diisocyanate, was added (0.7236 g) with a catalyst (triethylamine, 0.0188 g). The solution was refluxed at 85° C. for 3 days. The PVA beads were recovered by filtration, washed with toluene and dried under vacuum. The cross-linked beads were found to have improved mechanical strength and were also found to be insoluble in water. Both the spherical shape and the internal porous structure were retained after cross-linking. The open pores on the bead surface were also retained.

A sample of the yellow PEG porous beads prepared in Example 5 (0.0634 g) was added to toluene (50 ml). A cross-linker, tolylene 2,4-diisocyanate, was added (0.60 g) with a catalyst (triethylamine, 0.012 g). The solution was refluxed at 85° C. for 3 days. The yellow beads were then recovered by filtration, washed with toluene and dried under vacuum. The cross-linked beads were found to have improved mechanical strength and were found to be insoluble in water. Both the spherical shape and the internal porous structure were retained after cross-linking. The open pores on the bead surface were also retained.

EXAMPLE 23

An experiment was conducted in order to produce PVA/PS composite porous beads. Table 17 shows the composition of the emulsion used in this experiment.

TABLE 17

| | |
|---|---|
| PVA 5 wt % solution: | 3.0 ml |
| Sodium dodecyl sulphate (98%): | 0.40 g |
| PS/Cyclohexane solution: | 3.0 ml |

A solution of polystyrene (PS, Mw=30,000 g/mol) was prepared in cyclohexane to give a PS concentration of 13.25 wt %. This was emulsified with a 5 wt % PVA solution according to Table 17. The emulsion was injected into liquid nitrogen and the frozen beads were then freeze-dried in a commercial freeze-drier. Uniform white dry beads were collected after freeze-drying.

FIG. 20 shows an electron micrograph of the internal structure of the composite beads. After freeze-drying, the PS was deposited from the cyclohexane phase in the form of fine particles within the porous PVA structure. The beads were found to dissolve readily in distilled water at 25° C. This released the precipitated PS particles from the PVA matrix to form a uniform, opaque white PS latex, as shown in FIG. 21. This latex was observed to be stable without settling for at least 24 h. This is an Example of polymer precipitation within the porous structure of the PVA bead followed by subsequent release in water to form a stable latex of the type that may be used for coatings or other similar applications.

Figure 22:
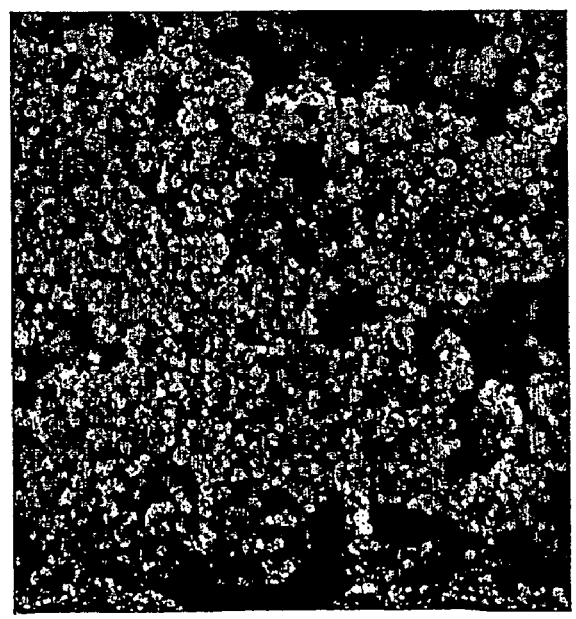
FIG. 22, shows an electron micrograph of PS particles deposited on an aluminium stub after evaporation of the latex shown in FIG. 21.

The latex was stable for several days but after many days settling was observed. A small amount of latex was evaporated on an aluminium stub. FIG. 22 shows an SEM image of the film formed from this latex. Relatively uniform micrometer-sized polystyrene particles were observed with an average diameter of about 2 mm. This demonstrates that a complex hierarchical structure was formed in the one-step bead production process.

EXAMPLE 24

An experiment was conducted in order to produce PVA/poly(DL-lactide-co-glycolide) (PLGA) porous composite beads. Table 18 shows the composition of the emulsion used in this experiment.

TABLE 18

| | |
|---|---|
| PVA 5 wt % solution: | 3.0 ml |
| Sodium dodecyl sulphate (98%): | 0.42 g |
| PLGA/C2Cl2 solution: | 3.5 ml |

A solution of poly(DL-lactide-co-glycolide) (PLGA, 50/50, Birmingham Polymers, Inc.) was prepared in CH2Cl2 to give a PLGA concentration of 24.04 wt %. This solution was then emulsified with a 5 wt % PVA solution according to Table 18. The emulsion was injected into liquid nitrogen and uniform white dry beads were collected after freeze-drying.

SEM results show that some phase-separation had occurred inside the beads. PLGA particles were observed to be embedded in the porous PVA matrix. The beads dissolved rapidly in water to form a PLGA-in-water latex that exhibited limited stability. A small amount of this latex was evaporated on an aluminium stub. Micrometer-sized PLGA particles were observed by SEM analysis. This demonstrates that a complex hierarchical structure was formed in the one-step bead production process.

EXAMPLE 25

An experiment was conducted in order to produce PVA/poly(DL-lactide-co-glycolide) (PLGA) porous composite beads with a dye. Table 19 shows the composition of the emulsion used in this experiment.

TABLE 19

| PVA 5 wt % solution: | 3.0 ml |
| Sodium dodecyl sulphate (98%): | 0.42 g |
| PLGA/C2Cl2/dye solution: | 2.0 ml |

A solution of Disperse Red 1 in CH2Cl2 was prepared Poly(DL-lactide-co-glycolide) (PLGA, 50/50, Birmingham Polymers, Inc.) was then added to this solution to give a PLGA concentration of 13.40 wt %. An emulsion was formed with the aqueous PVA solution, as before, and frozen to form beads. After freeze-drying, red beads were collected.

When the beads were dissolved in water, a red latex was observed. A small amount of this latex was evaporated on an aluminium stub. Micrometer-sized PLGA particles were observed by SEM analysis and demonstrated that a complex hierarchical structure had been formed in the one-step bead production process. FIG. 23, shows an SEM image of the latex particles released from the beads by dissolution of the PVA.

The invention claimed is:

1. A hydrophilic porous polymeric bead comprising a three dimensional open-cell lattice of a water-soluble polymeric material, the lattice having a porous structure providing in the bead an intrusion volume of at least about 3 ml/g.

2. A hydrophilic porous polymeric bead according to claim 1, wherein the intrusion volume is at least about 3.5 ml/g.

3. A hydrophilic porous polymeric bead according to claim 2, wherein the intrusion volume is at least about 4 ml/g.

4. A hydrophilic porous polymeric bead according to claim 3, wherein the intrusion volume is at least about 4.5 ml/g.

5. A hydrophilic porous polymeric bead according to claim 1 formed from an emulsion.

6. A hydrophilic porous polymeric bead according to claim 5, wherein the emulsion has an internal phase in the range of from about 50% to about 80%.

7. A hydrophilic porous polymeric bead according to claim 1, wherein the lattice comprises more than one distinct pore type.

8. A hydrophilic porous polymeric bead according to claim 1, wherein the bead comprises surfactant moieties dispersed throughout the lattice.

9. A hydrophilic porous polymeric bead according to claim 1, wherein an active ingredient is disposed in the lattice.

10. A population of hydrophilic porous polymeric beads according to claim 1, the population having a substantially uniform size distribution.

11. A method for producing a population of porous hydrophilic polymeric beads according to claim 10 comprising the steps of:
a) providing an emulsion comprising an aqueous phase, an organic phase and a hydrophilic polymeric material;
b) providing a fluid medium at a temperature effective for freezing the emulsion;
c) injecting the emulsion into the fluid medium to form frozen droplets;
d) isolating the droplets, and
e) freeze-drying the droplets to form beads.

12. A method according to claim 11, wherein the beads are chemically cross-linked by a cross-linking agent after freeze-drying.

13. A method according to claim 11, wherein the emulsion comprises an emulsifier.

14. A method according to claim 11, wherein the emulsion comprises a continuous aqueous phase with the hydrophilic polymeric material dissolved therein and a discontinuous organic phase.

15. A method according to claim 11 wherein the polymeric material is selected from one or more from the following group of polymers; poly(vinyl alcohol), poly(ethylene glycol), poly(ethylene oxide), poly(vinyl pyrrolidone), poly(acrylic acid), poly(acrylic acid)-sodium salt, poly(acrylamide), poly(sodium styrene sulfonate), poly(2-acrylamido-2-methyl-1-propanesulfonic acid) and polysaccharides.

16. A method according to claim 11, wherein the organic phase comprises a solvent selected from one or more of; heptane, n-hexane, isooctane, dodecane, decane, toluene, xylene, cyclohexane, mineral oil, dichloromethane, dichoroethane and tetrachloroethane.

17. A method according to claim 11, wherein the aqueous phase comprises an active ingredient for incorporation into the beads.

18. A method according to claim 11, wherein the organic phase comprises a hydrophobic active ingredient for incorporation into the beads.

19. A method according to claim 11, wherein the freezing medium comprises an active ingredient for incorporation into the beads.

20. A method according to claim 17, wherein the active ingredient is selected from one or more from the following group; pharmaceutical actives, pharmaceutical salts, enzymes, dyes, oxidising agents, cleaning agents, fabric softeners, clothes care agents, bleaches, reducing agents, flavours, fragrances, metal nanoparticles, vitamins and nutraceuticals.

* * * * *